JAMES C. BARROWS.

Tug-Buckles.

No. 126,920.  Patented May 21, 1872.

Witnesses:
P. C. Dieterich
H. A. Graham

Inventor:
J. C. Barrows
per
Attorneys

UNITED STATES PATENT OFFICE.

JAMES C. BARROWS, OF CENTREVILLE, IOWA.

IMPROVEMENT IN TUG-BUCKLES.

Specification forming part of Letters Patent No. 126,920, dated May 21, 1872.

Specification describing a new and Improved Tug-Buckle, invented by JAMES C. BARROWS, of Centreville, in the county of Appanoose and State of Iowa.

Figure 1:
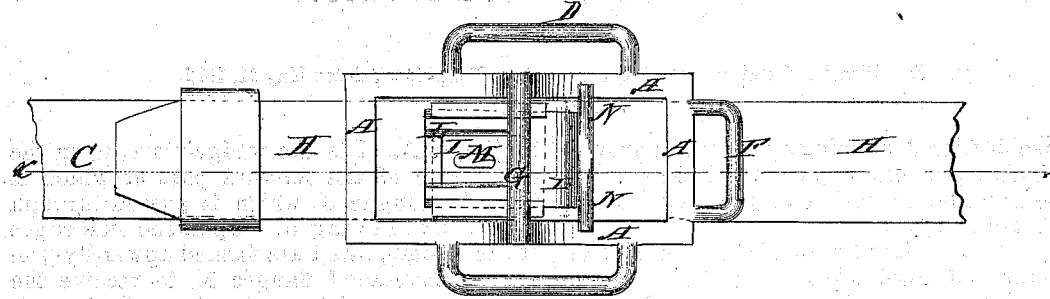
Figure 2:
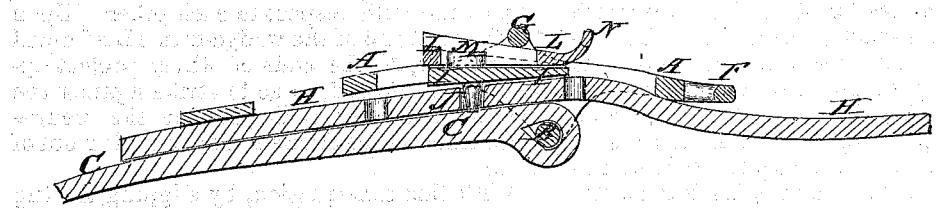
Figure 3:
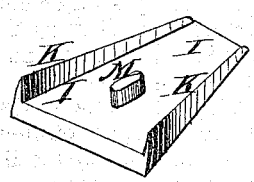

Figure 1 is a detail view of the outer side of my improved tug-buckle. Fig. 2 is a detail longitudinal section of the same taken through the line $x\,x$, Fig. 1. Fig. 3 is a perspective view of the wedge-plate.

Similar letters of reference indicate corresponding parts.

My invention has for its object to furnish an improved tug-buckle, which shall be simple in construction, effective and reliable in operation, easily adjusted, easy upon the tug, and will not wedge the tug between two iron plates and thereby injure it; and it consists in the construction and combination of the various parts of the buckle, as hereinafter more fully described.

A represents the frame of the buckle, upon the middle part of the under side of which are formed lugs, upon which is formed or to which is attached the bar or bolt B, to which the hame-tug C is secured. The bar B may be a solid part of the frame A, or it may be a separate bolt secured to said frame. Upon the upper side bar of the frame A is formed a loop, D, to receive the back strap. Upon the lower side bar of the frame A is formed a loop, E, to receive the belly-band, and upon the rear end bar of the frame A is formed a loop, F, to receive the hold-back strap. Upon lugs formed upon the outer side of the middle part of the side bars of the frame A is formed a guard-bar, G. H is the tug, which is passed in beneath the rear-end bar of the frame A, beneath the guard-bar G, along the rear part of the hame-tug C, and under the front-end bar of the frame A. I is the wedge-plate, upon the under side of the forward part of which is formed a tongue, J, which is passed through the holes of the tug H. Upon the side edges of the wedge-plate I are formed upwardly-projecting dovetailed flanges K, to receive the dovetail edges of the wedge-frame L, through the open center of which passes a projection, M, formed upon the upper side of the forward part of the wedge-plate I, to keep the wedge-plate I and wedge-frame L from getting out of position with respect to each other. Upon the forward end of the wedge-frame L is formed a cross-bar, N, the ends of which project upward and outward, so as to strike against the guard-bar G and thus prevent the wedge-plate I and wedge-frame L from slipping out of place.

With this construction, by slipping the tug H forward the wedge-plate I and wedge-frame L will be loosened so that their forward ends may be turned up, withdrawing the tongue J from the tug, and allowing it to be easily adjusted or detached.

Having thus described my invention, I claim as new, and desire to secure by Letters Patent—

The wedge-plate I, formed with a tongue, J, dovetailed flanges K, and projection M, and the dovetailed wedge-frame L provided with a cross-bar, N, in combination with the frame A provided with loops D E F, hame-tug bar or bolt B, and guard-bar G, substantially as herein shown and described, and for the purpose set forth.

JAMES C. BARROWS.

Witnesses:
MARTIN L. WARE,
THOMAS MCCLASKEY.